United States Patent [19]

Lindsay et al.

[11] Patent Number: 4,997,476

[45] Date of Patent: Mar. 5, 1991

[54] RECOVERY OF FREE ALUMINUM FROM ALUMINUM DROSS USING PLASMA ENERGY WITHOUT USE OF A SALT FLUX

[75] Inventors: Richard D. Lindsay; Jack L. Dochterman; David L. Cheek; Robert L. Kirkland, all of Raleigh, N.C.

[73] Assignee: Plasma Energy Corporation, Raleigh, N.C.

[21] Appl. No.: 408,388

Related U.S. Application Data

[63] Continuation-in-part of Ser. No. 281,049, Dec. 8, 1988

[22] Filed: Sep. 18, 1989

[51] Int. Cl.$^5$ ............................................. C22B 4/00
[52] U.S. Cl. ................................................ 75/10.21
[58] Field of Search .................. 75/10.21, 68 A, 68 R, 75/24

[56] References Cited

U.S. PATENT DOCUMENTS 4,177,060 12/1979 Tylko .................................. 75/10.21
4,523,949 6/1985 Gower .................................. 75/24

Primary Examiner—Peter D. Rosenberg
Attorney, Agent, or Firm—A. W. Breiner

[57] ABSTRACT

A process for recovering free aluminum and aluminum compounds such as aluminum oxide from aluminum dross in a rotary furnace heated with a plasma arc torch wherein air is preferably utilized as the arc gas is described. The use of the rotary furnace heated with plasma energy eliminates the need for a salt flux, providing a process which is ecologically safe and cost effective. A process of converting non-metallic aluminum compounds to substantially pure aluminum oxides by heating the compounds with a plasma torch operating with an oxidizing gas as the plasma torch arc gas is also described.

21 Claims, 3 Drawing Sheets

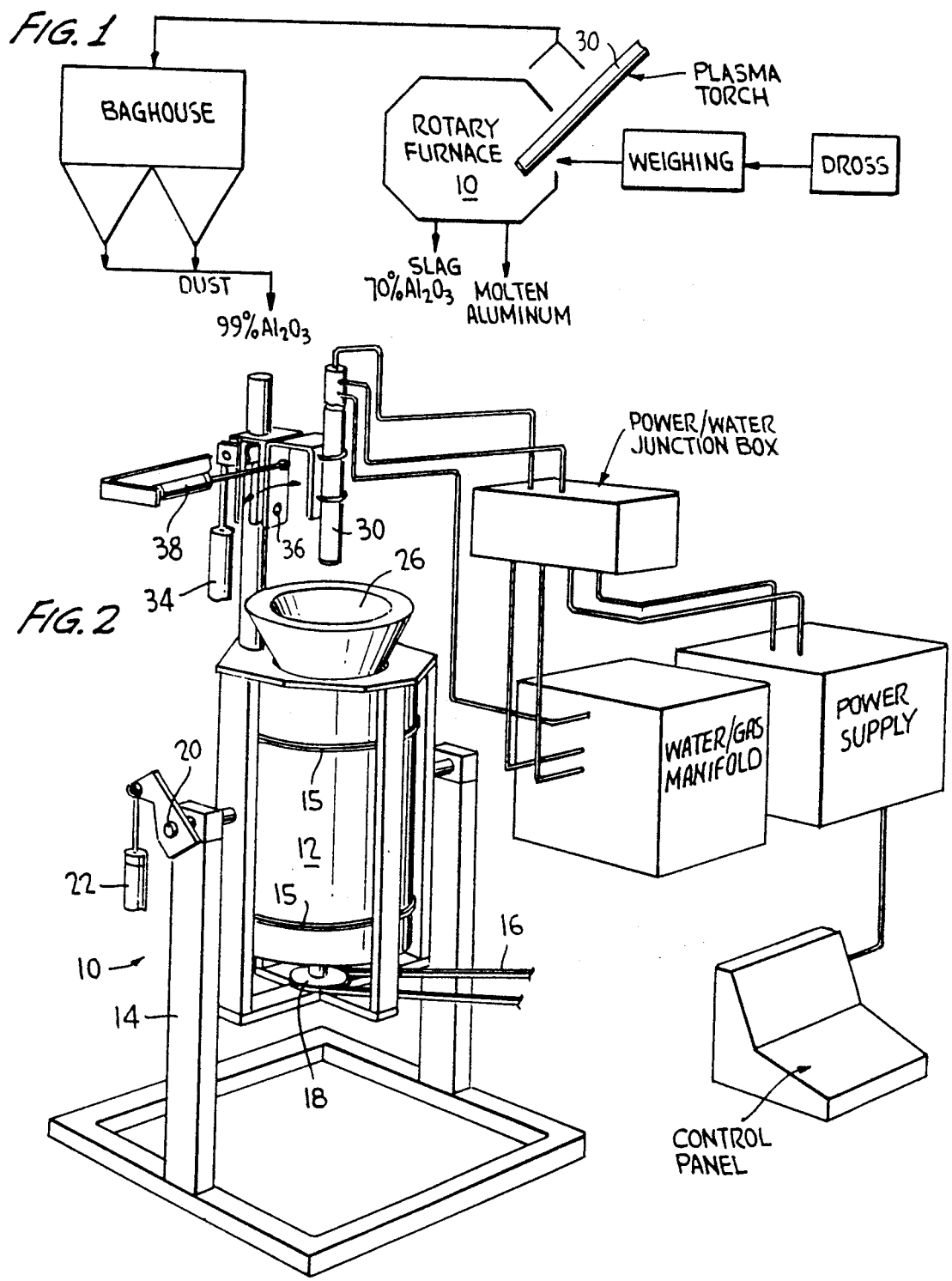

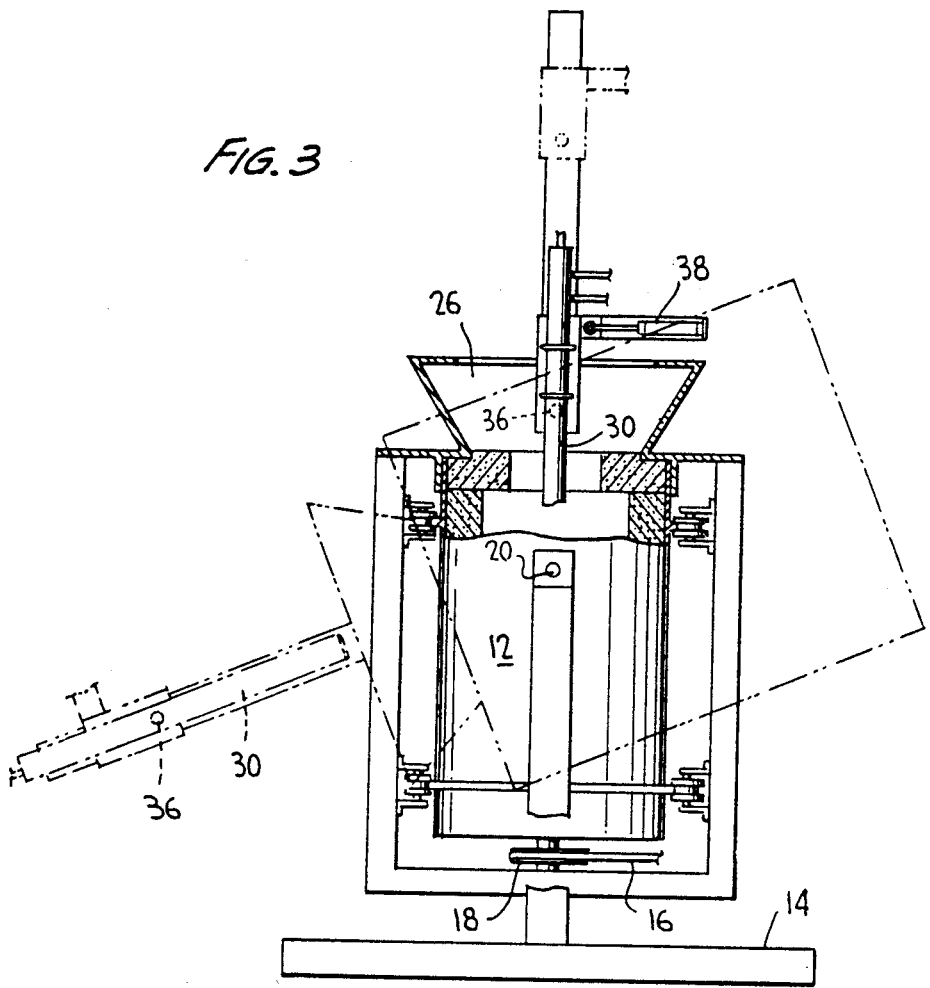
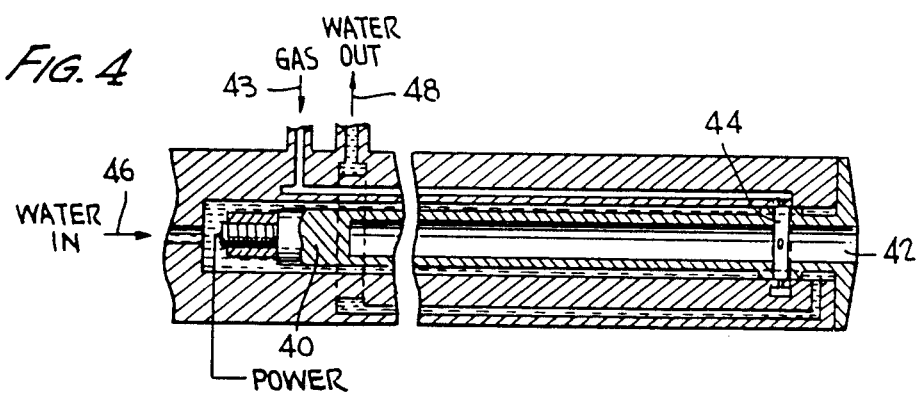

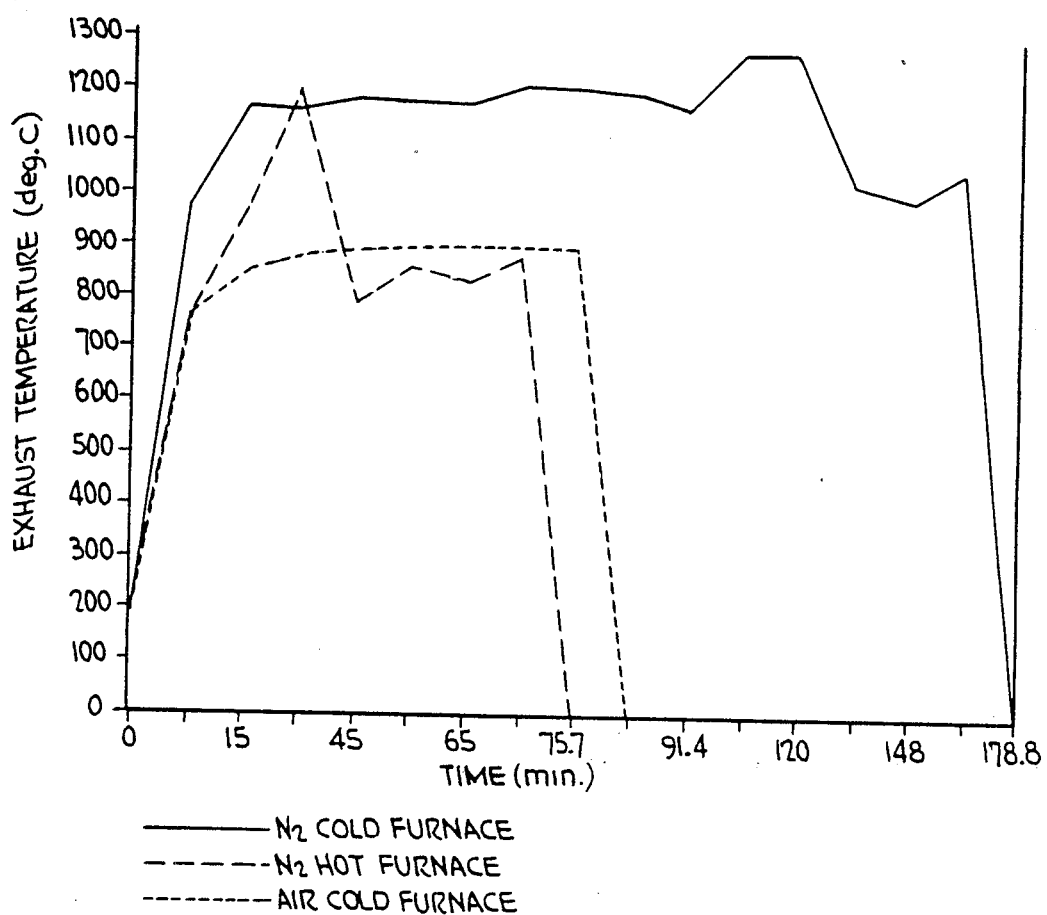

RECOVERY OF FREE ALUMINUM FROM ALUMINUM DROSS USING PLASMA ENERGY WITHOUT USE OF A SALT FLUX

RELATED APPLICATION

This application is a continuation-in-part of commonly assigned Richard D. Lindsay, U.S. Ser. No. 281,049 filed Dec. 8, 1988, entitled "Process for Recovery of Free Aluminum from Aluminum Dross or Aluminum Scrap Using Plasma Energy."

FIELD of INVENTION

This invention relates to the recovery of free aluminum from aluminum dross. More particularly, the invention relates to a process for the recovery of aluminum metal from aluminum dross in a rotary furnace heated with a plasma arc torch, preferably operated on air as the arc gas. Surprisingly, it is possible to recover free aluminum and aluminum by-products in good yield without use of a salt flux and the attendant difficulties associated with the use of a salt flux, including environmental problems.

BACKGROUND OF INVENTION

When a body of aluminum is melted in a furnace for purposes of casting or the like, dross forms on the surface of the molten aluminum which must be periodically removed, for example by skimming or similar operation. The removed dross contains substantial amounts of free aluminum as well as aluminum oxides, such as bauxite, and certain other metals and metal salts, such as magnesium, manganese and lithium, depending on the nature of the aluminum or aluminum alloy being treated. The dross may also include some nitrides and chlorides, possibly due to the manner in which the dross is treated.

It is recognized in the industry that for economical reasons it is critical to recover in usable form the free aluminum, aluminum oxide, and other by-product metals from the dross. It is also recognized, however, that the recovery of these materials from dross is difficult due, inter alia, to the nature of the dross and the reactivity of aluminum. In a typical recovery process the dross is normally melted at high temperatures in a furnace. However, at elevated temperatures the dross, particularly the free aluminum in the dross, is easily susceptible to oxidation and, moreover, commonly tends to ignite and burn in the presence of air. The burning of the aluminum can decrease substantially the amount of aluminum recovered.

To solve the problems associated with treating dross and improve the efficiency of aluminum recovery, it has been proposed to heat the dross in an induction furnace in the presence of a salt flux. See, for example, McLeod et al, U.S. Pat. No. 3,676,105. The use of a salt flux, which tends to agglomerate the free aluminum, is not desirable because of high costs and in that the salt, which tends to be water-leachable, in turn, must be separated from the aluminum, leading to cost and environmental problems.

It has been suggested in the prior art to recover aluminum metal in the gaseous state by breaking down aluminum salts at temperatures of at least 2500° to 5500° C. The heating to the essential high temperature, as disclosed in Othmer, U.S. Pat. No. 3,938,988, can be carried out using plasma energy from a plasma arc torch. According to the disclosed process, a liquid coolant is utilized to flash-cool a mixture of aluminum and other elemental gases to effect separation. This procedure is not conducive to the treatment of dross, and further is not practical for dross treatment either from the standpoint of cost or the ecology.

The use of a plasma jet generator has also been suggested for reducing various metal oxides, including aluminum oxides. See, for example, Tylko, U.S. Pat. No. 4,177,060, where carbon and alumina are supplied to a molten reactor bed maintained in a reaction chamber with the carbothermal reduction occurring through application of plasma energy from a plasma torch. The use of carbon in the reduction of alumina, i.e., a chemical reaction, is substantially different from the treatment of dross where separation of materials only is desired.

Accordingly, there is a substantial need in the industry for an improved process for recovering free aluminum, aluminum compounds such as the aluminum oxides, and other by-product metals from aluminum dross. It is particularly desirable that such process be cost effective and ecologically safe.

SUMMARY OF INVENTION

The present invention provides a process for the recovery of free aluminum and aluminum oxides from aluminum dross comprising heating the dross in a high-temperature rotary furnace using a plasma arc torch, preferably fed with air as the arc gas, without use of an added salt flux. It has been found, surprisingly, that the use of a rotary furnace heated with plasma energy from a plasma gun or torch will separate and agglomerate the free aluminum from the dross residue without need for a salt flux. It is believed that the rotating furnace in combination with plasma currents from the plasma torch causes the free aluminum to agglomerate as it is being heated, without necessity of added salts. It is preferable that the plasma torch or gun be directed towards the walls of the furnace, rather than directly into the charge, in order that the dross is heated indirectly by the furnace walls. This indirect heating of the dross eliminates or reduces the nitriding effect when using nitrogen as the arc gas, or the formation of oxides when using air as the arc gas. Preferably the rotating furnace will include a tilting mechanism which is advantageous for tapping of the free molten aluminum and removal of solid residue from the furnace.

As an added advantage of the present invention it has been found that in the use of the rotating furnace heated with plasma energy, aluminum oxides—either initially present in the dross or formed during the dross treatment—build up on the walls of the furnace to line the furnace. The free aluminum which melts at a lower temperature than the oxides agglomerates within the interior of the built-up lining where it can easily be removed from the furnace. The built-up aluminum oxide can be periodically removed, for example after each run or after two or three runs, from the walls of the furnace.

The ability to carry out the dross treatment, without need of a salt flux during the treatment of dross, avoids serious pollution problems caused by the generation of salt fumes and precludes the need for the disposal of water-leachable salts. The salts, being water-leachable, are troublesome in landfill sites in that they are carried into the soil with waste or rain water, causing severe pollution problems. Moreover, the dross residue, not being diluted with a salt flux, remains solid and is easily recovered from the molten free aluminum.

The advantageous results of the present invention are obtained when using a variety of arc gases for the plasma generator including air, nitrogen, hydrogen, carbon monoxide, carbon dioxide, argon, methane, as well as mixtures of these gases. The recovery of free aluminum and useful aluminum by-products is higher and, additionally, the problems associated with elimination of salts is not present. Although various arc gases are available for use, the use of air as the arc gas is highly preferred. As set forth in Lindsay, U.S. Ser. No. 281,049, air in comparison to nitrogen (1) provides 40% more heat output with the same electrical input (KW/hr), resulting in a shorter processing time and substantially higher throughputs, approximately two times the throughput;

(2) provides reduced nitride formation since the hottest part of plasma which is closest to the torch is oxidizing not nitriding;

(3) provides an oxide, $Al_2O_3$, which is stable and not an environmental problem in contrast to a nitride which is produced with nitrogen which is unstable and can be an environmental problem; and (4) is more economical since air is much cheaper than nitrogen or argon, or any other available inert arc gas.

The ability to use air as the arc gas and the enhanced results obtained are surprising. It was to be expected that the preferred gas would be nitrogen or other non-oxidizing gas such as argon, neon, and the like so as to avoid oxidation and burning of the aluminum a would be expected to occur in the presence of air. However, it was found that when using nitrogen as the arc gas nitriding occurred, causing difficulty in the operation of the torch and in substantial loss of aluminum; whereas air not only did not burn to any substantial degree, but provided highly beneficial results. Excessive oxidation of the aluminum does not occur when air is used as the arc gas because of the very limited amount of air admitted through the plasma torch; and, accordingly, the aluminum burning is controlled. The loss of aluminum is lower than that lost due to nitriding with nitrogen as the arc gas, and additionally increased heat output with the sam electrical KW/hr input is obtained. This, in turn, results in the shorter processing time and substantially higher, approximately twice, dross throughput. The unexpected ability to use air and the advantages obtained are set forth and claimed in the aforesaid Lindsay application.

THE DRAWING AND DETAILED DESCRIPTION

A presently preferred embodiment will be described in reference to the drawing wherein;

FIG. 1 is a flow diagram of the process of the present invention;

FIG. 2 is a schematic drawing of a preferred rotary furnace, plasma arc torch, and supply system used in the process of this invention;

FIG. 3 is a side elevational view of the furnace and plasma torch shown in FIG. 2;

FIG. 4 is a schematic cross-section of the plasma arc torch used in the present invention; and FIG. 5 is a comparative temperature profile using air and nitrogen as the arc gas.

Referring to FIG. 1, in the process of the present invention, dross is weighed and charged into a furnace 10. After charging the dross to the furnace, a plasma arc torch 30 is brought into position in the furnace and the dross heated to the molten state. The molten free aluminum is recovered. The dust recovered from the furnace which is about 99% aluminum oxide is passed to a bag house. The slag or residue which forms on the furnace walls is scraped from the furnace and is preferably recharged to the furnace with additional dross, or is further treated with a plasma torch, as will be hereinafter developed, to provide useful non-metallic products (NMP's).

The preferred furnace, as shown in FIGS. 2 and 3, is a tilting, rotating furnace. Thus, the furnace comprises a rotating drum 12 on frame 14 which is driven on rails 15 by belt 16 and pulley 18 with an electric motor (not shown). As is also shown in FIGS. 2 and 3, the drum, carrying torch 30, tilts about pivot point 20, preferably actuated by an air cylinder 22, to permit convenient recovery of the free molten aluminum. Accordingly, the supply lines to the plasma torch must be flexible.

Plasma torch 30 is removably positioned in cover 26 of furnace 10. The torch on frame 14 is moved vertically into and out of position by an air cylinder 34. Once in position in the furnace, the torch can be swung back and forth within the furnace in order to cover the entire furnace area around pivot point 36 by activation of air cylinder 38. The torch is positioned independent of drum 12 to permit rotation of the drum.

Plasma torches which are operable in the process of the invention are of the transfer and non-transfer type commercially available from Plasma Energy Corporation, Raleigh, N.C., assignee of the present invention. Suitable torches are also described in Camacho, U.S. Pat. No. 4,383,820; and Camacho et al, U.S. Pat. No. 4,559,439. A simplified cross-section of a suitable transfer arc torch is shown in FIG. 4 of the drawing. As illustrated, the torch designed for operating in the transferred arc mode includes an electrode 40, a collimator 42, a vortex generator 44, water input means 46 for cooling the torch mechanism, and a water output means 48. Gas input means 43 feeds gas to the vortex generator 44 between electrode 40 and collimator 42. In the plasma generator system the furnace base and the dross being heated function as the ground for receiving the transferred arc from electrode 40. As shown in FIG. 2, the water/gas manifold and the electrical power supply for the torch are supplied to a power/water junction box and then fed to the torch. The arc gas, preferably air, is ionized between the vortex generator and the collimator.

It has also been found that enhanced recovery of free aluminum without a salt flux is obtainable when using a non-transfer arc plasma torch wherein the cathode is the front electrode and the anode is the rear electrode. Torches of this type are manufactured by the Plasma Energy Corporation, for example under the designation PT250N. It is believed that the improved result is obtainable because the plasma flame from this type of torch contains a large number of active ions. If the cathode is the rear electrode, these ions would recombine before leaving the torch and reaching the work surface. The front cathode provides, therefore, a more active ion species. These more active species enhance the ability to separate free aluminum from dross residue without use of a salt flux. "Non-transferred arc," as the term is used herein, is used in the traditional sense, meaning that both the anode and cathode are within the torch. In contradistinction, in a transferred arc torch, one of the electrodes is or is at the work surface.

The invention will be more specifically defined by the following examples:

EXAMPLE 1

2.5 tons (5000 pounds) of aluminum alloy dross containing approximately 50% aluminum was charged into rotating furnace 10. A PT250N non-transferred arc plasma torch 30 manufactured by the Plasma Energy Corporation was lowered into position and directed by air cylinder 38 to contact substantially the center of the bottom of furnace drum 12. Electrical power, coolant water, and air arc gas were supplied to torch 30. With rotation of the furnace drum 12, the charge was heated to the molten condition, and thereafter the heating was continued with torch 30 directed towards the wall of the furnace for a period of one hour. The torch was then withdrawn and the molten aluminum discharged by tilting the furnace drum. The 5000-pound charge produced 2375 pounds of pure alloy aluminum. The slag was scraped from the bottom of the drum to provide 2740 pounds of aluminum oxide. Additionally, 100 pounds of aluminum oxide was recovered from the bag house. The increase in total weight is due to the oxygen present in the form of oxides.

In this example the recovery of pure alloy aluminum was 47.5% of the original charge, with the residue being primarily usable aluminum oxide and stable mixed metal oxide by-product. This contrasts with the usual recovery of approximately 35% free aluminum attainable with a conventional rotary furnace using salt as a flux. For example, it has been found that if the dross contains 50% free aluminum, the recovery using a salt flux will be approximately 35% aluminum, with the remaining 65% being aluminum oxide and other aluminum by-products in mixture with up to about 15% aluminum. This relatively high percentage of free aluminum must either be separately recovered or converted to aluminum oxide since the free aluminum content is too high to permit use of the by-product as an oxide. In contrast, in the process of the present invention where the dross contains 50% aluminum, the recovered free aluminum is approximately 47% to 50%, with the balance being aluminum oxide and stable mixed metal oxides with less than about 3% free aluminum. The oxides can thus be used effectively as aluminum oxide products without further processing since the low aluminum content is not detrimental.

EXAMPLE 2

The process of Example 1 was repeated. However, in this instance the arc gas was nitrogen. For a two-hour reaction time, i.e., twice the time used with air as the arc gas, the recovery was as follows: 2200 pounds of pure alloy aluminum; 2740 pounds of slag, and 50 pounds of dust.

The advantages of using air as the arc gas is shown by the comparative temperature profile set forth in FIG. 5. As seen from FIG. 5, when starting with a cold furnace and nitrogen as the arc gas, the heating cycle required 178 minutes, with the maximum exhaust temperature approaching 1200° C. In contradistinction, when operating with air with a cold furnace, the maximum temperature of approximately 850° C. was reached in approximately 80 minutes. This is similar to the temperature profile obtained with nitrogen on a hot furnace.

In the aforesaid examples, the advantage of using air as the arc gas in the aluminum recovery is demonstrated. However, although air is the preferred oxidizing arc gas, it is possible and advantageous to use other oxidizing arc gases including oxygen, mixtures of oxygen and air, or mixtures of air and nitrogen, nitrogen, hydrogen, carbon monoxide, carbon dioxide, methane, and mixtures of such gases, and still realize substantial advantage over prior art methods where a salt flux is used. This is particularly possible since, following the processing of aluminum and aluminum alloy drosses in a rotary furnace configuration using either a plasma torch or fossil fuels, the residual refractory-like product which collects on the furnace wall and which is composed of mixed metal oxides and/or aluminum nitride, as well as minor amounts of aluminum chloride, magnesium nitrides and trapped aluminum, can be subjected to a controlled plasma oxidation. Thus, the residual refractory-like product is treated in the plasma-furnace system wherein the plasma torch is used to introduce oxygen, air-oxygen enriched blends (greater than 50% oxygen), $CO_2$-oxygen enriched blends (greater than 40% oxygen), or oxygen-argon blends (greater than 40% oxygen) as the arc gas to oxidize the residue and achieve nitride, chloride, and metal contents of less than about 1%. With some alloys it may be desirable to introduce a fluxing agent to assist or accelerate the process. Where the flux is less than 5% of the charge, the resultant by-products, which are substantially all oxides, are subsequently used in known applications as refractories and the like.

EXAMPLE 3

The 2740 pounds of slag and 50 pounds of dust recovered in Example 2 above, comprised of 30% aluminum nitride, 3% free molten aluminum trapped in the residue and the balance a mixture of metal oxides, was heated in a rotary furnace with plasma torch 30 to a temperature of 460° C. using a plasma torch operated with a controlled flow of 150 SCFM of oxygen at a plasma power level of 1 MW. After forty-five minutes of operation, the furnace was shut down and the charge removed. The charge was substantially pure mixed metal oxides (Al, Mg, Al-Mg oxides/spinels).

Accordingly, the disadvantage normally associated with nitriding or in having chlorides and other by-products present is eliminated.

As will be apparent to one skilled in the art, various modifications can be made within the scope of the aforesaid description. Such modifications being within the ability of one skilled in the art form a part of the present invention and are embraced by the appended claims.

It is claimed:

1. A process of recovering free aluminum from aluminum dross comprising charging aluminum dross to a rotary furnace equipped with a plasma arc torch for heating said charge; heating said charge by providing plasma energy to said charge generated by said plasma arc torch while rotating said furnace at a rate sufficient to agglomerate free aluminum in said furnace as it becomes molten; continuing said heating while rotating until said charge is completely molten and the free aluminum is agglomerated in the furnace, and removing free aluminum in the molten state from said furnace; said process being carried out entirely in the absence of an added salt flux.

2. The process according to claim 1 wherein air is fed to said plasma arc torch as the arc gas.

3. The process according to claim 2 wherein said air is mixed with oxygen.

4. The process according to claim 2 wherein said air is mixed with nitrogen.

5. The process according to any one of claims 1-4 wherein the process is a batch operation.

6. The process according to any one of claims 1-4 wherein the process is a continuous operation with periodic tapping of the furnace to remove the free aluminum.

7. The process according to any one of claims 1-4 wherein said plasma arc torch includes means for changing the direction of plasma discharge from said torch within said furnace, and said torch is directed in order that the plasma discharge is towards a furnace wall of said furnace.

8. The process according to any one of claims 1-4 wherein said rotation of said furnace is continuous.

9. The process according to any one of claims 1-4 wherein said rotation of said furnace is intermittent.

10. The process according to any one of claims 1-4 wherein said torch is a non-transferred arc type torch having the cathode as the front electrode of the torch.

11. The process according to claim 1 wherein after said free molten aluminum is removed from said furnace the dross residue is subjected in said furnace to an oxidative treatment with a plasma arc torch operated with an oxidizing gas as the arc gas.

12. The process according to claim 11 wherein the oxidizing gas is oxygen.

13. The process according to claim 11 wherein the oxidizing gas is a mixture of oxygen and air.

14. The process according to claim 11 wherein the oxidizing gas is a mixture of oxygen and nitrogen.

15. A process of converting a solid material containing a mixture of non-metal aluminum components including at least one member of the group consisting of aluminum nitrides and aluminum chlorides to substantially pure aluminum oxides comprising heating said mixture of components with a plasma arc torch to introduce an oxidizing gas as the arc gas and, thereafter, recovering said substantially pure aluminum oxides.

16. The process of claim 15 wherein said solid material is the residue obtained from the treatment of aluminum dross and the removal of free aluminum therefrom.

17. The process according to claim 15 or 16 wherein said substantially pure oxides contain less than about 1% of said nitrides and chlorides.

18. The process according to claim 15 or 16 or 17 wherein the oxidizing gas is oxygen.

19. The process according to claim 15 or 16 or 17 wherein the oxidizing gas is a mixture of air and oxygen comprising greater than 50% oxygen.

20. The process according to claim 15 or 16 or 17 wherein the oxidizing gas is a mixture of carbon dioxide and oxygen comprising greater than 40% oxygen.

21. The process according to claim 15 or 16 or 17 wherein the oxidizing gas is a mixture of oxygen and argon comprising greater than 40% oxygen.

* * * * *